(12) United States Patent
Yonebayashi et al.

(10) Patent No.: US 9,296,430 B2
(45) Date of Patent: Mar. 29, 2016

(54) FRONT FLOOR PANEL

(71) Applicant: NIPPON STEEL & SUMITOMO METAL CORPORATION, Tokyo (JP)

(72) Inventors: Toru Yonebayashi, Tokyo (JP); Toshiya Suzuki, Tokyo (JP); Yoshiaki Nakazawa, Tokyo (JP); Masaya Takahashi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/366,334

(22) PCT Filed: Dec. 20, 2012

(86) PCT No.: PCT/JP2012/083095
§ 371 (c)(1),
(2) Date: Jun. 18, 2014

(87) PCT Pub. No.: WO2013/094691
PCT Pub. Date: Jun. 27, 2013

(65) Prior Publication Data
US 2014/0367999 A1 Dec. 18, 2014

(30) Foreign Application Priority Data
Dec. 20, 2011 (JP) ................. 2011-278332

(51) Int. Cl.
*B60N 99/00* (2006.01)
*B62D 25/20* (2006.01)
(Continued)

(52) U.S. Cl.
CPC ............... *B62D 25/20* (2013.01); *B21D 22/02* (2013.01); *B21D 47/00* (2013.01); *B21D 53/88* (2013.01)

(58) Field of Classification Search
CPC ........ B62D 25/20; B21D 22/02; B21D 47/00; B21D 53/88
See application file for complete search history.

(56) References Cited

U.S. PATENT DOCUMENTS

2007/0080562 A1\* 4/2007 Taniguchi et al. ....... 296/187.05

FOREIGN PATENT DOCUMENTS

| JP | 08254244 | \* 10/1996 |
| JP | 11-223239 | 8/1999 |

(Continued)

OTHER PUBLICATIONS

M. Takahashi et al., "Depelopment of . . . high stiffness", The Japanese Society of Mechanical Engineers, the 20th Mechanical Design/Systems Lecture Meeting, p. 102-107, 2010.

*Primary Examiner* — Lori L Lyjak
(74) *Attorney, Agent, or Firm* — Clark & Brody

(57) ABSTRACT

A front floor panel for an automotive body as a lightweight sheet can be reliably press-formed without a press forming loads becoming excessively large, can have desired stiffness, and noise and vibration characteristics for all directions since there is little stiffness anisotropy. The front floor panel includes a floor tunnel formed in a center in an automotive width direction to be oriented to a longitudinal direction, upright flanges disposed left and right formed at a left and right end portions in the automotive width direction to be joined to side sills, and a left and right plane portions formed between the upright flanges disposed left and right and a left and right longitudinal wall portions of the floor tunnel. In loop-shaped areas including outer edge portions of the plane portions, convex-concave parts in specific shapes are formed, and remaining areas excluding the loop-shaped areas are formed into flat sheet shapes.

15 Claims, 11 Drawing Sheets

(51) Int. Cl.
  *B21D 22/02* (2006.01)
  *B21D 47/00* (2006.01)
  *B21D 53/88* (2006.01)

(56) References Cited

FOREIGN PATENT DOCUMENTS

| | | |
|---|---|---|
| JP | 2002-302071 | 10/2002 |
| JP | 2003-220978 | 8/2003 |
| JP | 2006-315627 | 11/2006 |
| JP | 2008-265540 | 11/2008 |
| JP | 4402745 | 11/2009 |
| JP | 2009-286249 | 12/2009 |
| JP | 2011-027248 | 2/2011 |
| JP | 2011-101893 | 5/2011 |
| JP | 2011-110847 | 6/2011 |
| JP | 2011-110954 | 6/2011 |
| JP | 2011-110983 | 6/2011 |
| JP | 2011-230174 | 11/2011 |

* cited by examiner

FRONT FLOOR PANEL

TECHNICAL FIELD

This invention relates to a front floor panel. Specially, the present invention relates to a front floor panel that configures a platform of an automotive body.

BACKGROUND ART

Most of the present automotive bodies are configured with monocoque bodies, each of which is formed by integrating a frame and a body that typically constitute a frame body, and the lower part of the body has a structure called a platform. FIG. 19 is an explanatory view schematically showing a structure of a platform 102 of an automotive body 101 in a simplified form.

As shown in this drawing, the platform 102 of the automotive body 101 is disposed in a part corresponding to the conventional frame. A dash panel 103 and a front floor panel 104 of the platform 102 are joined to each other with respective edge portions overlapped on each other, and the front floor panel 104 and a rear floor panel 106 are joined to each other with respective edge portions overlapped on each other.

A dash upper panel 103a and a dash lower panel 103b of the dash panel 103 are joined to each other with respective edge portions overlapped on each other. The dash panel 103 is a partition wall between an engine compartment in which an engine is placed and a cabin for vehicle occupants.

The front floor panel 104 has a floor tunnel 104a, upright flanges 104b disposed left and right, and plane portions 104c disposed left and right. The floor tunnel 104a provides a space for storing a propeller shaft and various kinds of piping in the center in the automotive width direction. The upright flanges 104b disposed left and right are joint portions for being joined to left and right side sills 105 having a closed section structure. The left and right plane portions 104c connects the floor tunnel 104a and the upright flanges 104b disposed left and right.

A rear floor front panel 106a and a rear floor rear panel 106b of the rear floor panel 106 are joined to each other with respective edge portions overlapped on each other.

The front floor panel 104 is required to have bending stiffness and torsional stiffness enough to suppress elastic deformation of a body due to a static load received from a mounted component such as a front seat and a load to the body from four tires while running. Furthermore, the front floor panel 104 is required to suppress occurrence of noise and vibration while running as much as possible so as to avoid uncomfortableness to the occupants, and to reduce weight to improve fuel efficiency of the automobile.

In order to meet such requirements, the art to obtain high stiffness and excellent noise and vibration characteristics without increasing the weight of a front floor panel by providing an convex-concave shape in a region that is to be the plane portion of the front floor panel is known.

For example, Patent Document 1 discloses the art of reducing uncomfortableness to occupants and increasing stiffness of the floor panel by increasing the resonance frequency of a floor panel, by forming convex portions on the floor panel, each of which is configured by combining the identical isosceles triangles so that a plane thereof has a particular angle.

Patent Document 2 discloses an insulator capable of securing sufficient stiffness without increasing the sheet thickness by forming a number of convex portions by embossing a heat insulator that is provided on a dash panel front surface or a lower part of a floor panel, with the convex portions having hexagonal shapes in plan view and the longitudinal sections which pass vertices forming a diagonal and are arc-shaped, and by arranging the convex portions so that flat sheet portions do not pass rectilinearly among the convex portions.

Patent Document 3 discloses the invention that reduces the sheet thickness of the floor panel while increasing stiffness with respect to the automobile width direction of the floor panel, by providing a bulged part that crossed with the floor tunnel and is oriented to the automobile width direction in the floor panel having the floor tunnel extended longitudinally in the central part of the automobile width direction.

The conventional technologies disclosed by Patent Documents 1 to 3 each aims at increasing stiffness, and noise and vibration characteristics by providing an convex-concave part in the entire front floor panel or the center of the plane portion. However, according to the research of the present inventors, the advantageous effect of increasing stiffness to such an extent that can reduce the sheet thickness of a floor panel cannot be obtained by using the technology disclosed in Patent Document 1, the manufacturing cost inevitably increases since a number of convex portions are formed in the sheet material by using the technology disclosed in Patent Document 2, and further, the technology disclosed in Patent Document 3 has the problem of an increase in stiffness anisotropy toward the end portions at the front and the rear of the floor panel.

Non Patent Document 1 and Patent Documents 4 to 9 do not necessarily relate to front floor panels, but disclose sheet materials or panels for automotive component members including convex-concave parts that can reduce stiffness anisotropy each by providing the identical shapes and areas for both top surfaces of convex-concave shapes that protrude in the up and down directions from the reference plane, and making the second moment of area large in every cross section.

PRIOR ART DOCUMENTS

Patent Document

Patent Document 1: Japanese Patent Laid-Open No. 2009-286249

Patent Document 2: Japanese Patent No. 4402745

Patent Document 3: Japanese Patent Laid-Open No. 2002-302071

Patent Document 4: Japanese Patent Laid-Open No. 2011-27248

Patent Document 5: Japanese Patent Laid-Open No. 2011-101893

Patent Document 6: Japanese Patent Laid-Open No. 2011-110847

Patent Document 7: Japanese Patent Laid-Open No. 2011-110954

Patent Document 8: Japanese Patent Laid-Open No. 2011-110983

Patent Document 9: Japanese Patent Laid-Open No. 2011-230174

Non Patent Document

Non Patent Document 1: CD-ROM of transactions of the JSME, p. 102-107, The Japanese Society of Mechanical Engineers, The $20^{th}$ Mechanical Design/Systems Lecture Meeting

SUMMARY OF THE INVENTION

Problem which the Invention is to Solve

Adopting the convex-concave parts disclosed in Non Patent Document 1, and Patent Documents 4 to 9 on front floor panels may achieve high stiffness without increasing the weights of the front floor panels. In fact, it is conceivable that if the front floor panel could be formed into the convex-concave shape by press forming that is conventionally used, and particularly if the convex-concave part could be formed in a bottom dead center of press forming, the front floor panel having the convex-concave part could be efficiently manufactured.

However, as a result of the research of the present inventors, even if the convex-concave parts are formed on the entire surface of the front floor panel made of a metal (for example, made of steel), it is actually impossible to manufacture the floor panel by press forming, because an extremely high forming load is necessary for press forming. Therefore, it is conceivable to limit the portion to be formed into the convex-concave part so as to be able to form the shape of the convex-concave part without the forming load when press forming, for example, becoming excessively large, but the method for achieving desired stiffness and noise and vibration characteristics is not even implied by any of the documents.

Further, as described above with reference to FIG. 19, the front floor panel 104 not only has the floor tunnel 104a, the upright flanges 104b disposed left and right and the left and right plane portions 104c, but also has a front end portion 104d joined to a lower end portion of the dash lower panel 103b, a rear end portion 104e joined to a front end of the rear floor front panel 106a, and the upright flanges 104b disposed left and right at both side portions joined to the left and right side sills 105. Therefore, depending on the forming method of the convex-concave part, the front floor panel may have stiffness anisotropy, and desired stiffness and noise and vibration characteristics are not achieved in the direction in which the stiffness is low.

Means for Solving the Problem

The present invention is based on the technical idea of substantially eliminating stiffness anisotropy of a front floor panel limiting a region in which an convex-concave part is formed as much as possible, by forming the convex-concave part in each of shapes (shapes shown in FIGS. 3 to 6 and FIGS. 10 to 12), which differ from the convex-concave parts disclosed by Patent Documents 4 to 9 and will be described later, to be loop-shaped by including joint portions to hems of the floor tunnel and side sills, instead of forming the convex-concave part in parts of centers or entire region of the plane portions of the front floor panel as disclosed in Patent Documents 1 and 3.

The present invention is provided as the following items (1) to (15).

(1) A front floor panel of a metal of an automotive body including a floor tunnel formed to be oriented in a longitudinal direction of the automotive body in a center in an automotive width direction of the automotive body, upright flanges disposed left and right formed at a left and right end portions in the automotive width direction to be joined to side sills, and a left and right plane portions formed between the upright flanges disposed left and right and a left and right longitudinal wall portions of the floor tunnel, the front floor panel having an convex-concave part described below that is formed in a loop-shaped area including an outer edge portion of the plane portion, and having a flat sheet-shaped portion formed in a remaining area except for the loop-shaped area;

wherein the convex-concave part: when based on three reference planes that are a first reference plane, an intermediate reference plane, and a second reference plane that are three surfaces sequentially arranged in parallel to be spaced from one another, a first unit area and a second unit area that are virtual squares are spread all over with the intermediate reference plane as a reference, and one of two directions along two sides orthogonal to each other of the virtual square is defined as a lateral direction, whereas the other one is defined as a longitudinal direction, the first unit area is divided into three at an optional ratio of A:B:A in the lateral direction, namely, is divided into first divided areas that are two areas divided at a ratio A, and a second divided area that is one area divided at a ratio B, the second unit area is divided into three at an optional ratio of A:B:A in the longitudinal direction, namely, is divided into second divided areas that are two areas divided at the ratio A, and a first divided area that is one area divided at the ratio B, with the intermediate reference plane as a reference, the first unit areas and the second unit areas are alternately disposed with respect to the longitudinal direction and the lateral direction respectively, a first reference area having a substantially I shape formed of the adjacent first divided areas, and a second reference area having a substantially I shape formed of the adjacent second divided areas are included, the convex-concave part is a shape part that has a first area protruding toward the first reference plane from the first reference area, and a second area protruding toward the second reference plane from the second reference area defined on the intermediate reference plane, the first area has a first top surface obtained by projecting the first reference area into the first reference plane at either unity or reduction magnification, and a first side surface that connects an contour of the first top surface and an contour of the first reference area, and the second area has a second top surface obtained by projecting the second reference area into the second reference plane at either unity or reduction magnification, and a second side surface that connects an contour of the second top surface and an contour of the second reference area.

(2) The front floor panel according to item (1), wherein the convex-concave part has two or more rows of areas having the substantially I shapes in the outer edge portion. At this point, in the case of having two rows of the substantially I shapes, for example, the substantially I shapes may be continuously disposed one by one in the width direction to make two rows, or 0.5, one and 0.5 of the substantially I shapes may be continuously disposed in the width direction to make two rows in total.

(3) The front floor panel according to item (2), wherein an area of the loop-shaped area is from 40% to 85% of an area of the plane portion. However, if the load performance of a pressing machine is higher, the upper limit value 85% will increase.

(4) The front floor panel according to any one of items (1) to (3), wherein one or two or more of the convex-concave parts are formed annularly in a partial area of a remaining plane portion except for the loop-shaped area.

(5) The front floor panel according to any one of items (1) to (3), wherein one or two or more of the convex-concave parts are formed rectilinearly in a partial area of a remaining plane portion except for the loop-shaped area.

(6) The front floor panel according to item (5), wherein the two or more convex-concave parts formed rectilinearly intersect each other.

(7) The front floor panel according to any one of items (1) to (6), wherein the first reference area and the second reference area are configured by each connecting the first divided areas and the second divided areas, and thereafter, deforming parts of corner portions of both of the first divided areas and the second divided areas into circular arc shapes in such a manner that areas of both of the first divided areas and the second divided areas do not change.

(8) The front floor panel according to any one of items (1) to (7), wherein an inclination angle $\theta_1(°)$ of the first side surface to the intermediate reference plane and an inclination angle $\theta_2(°)$ of the second side surface to the intermediate reference plane are respectively 10° to 90°.

(9) The front floor panel according to any one of items (1) to (8), wherein at least parts of the first reference plane, the intermediate reference plane and the second reference plane that are sequentially arranged are respectively formed of parallel curved surfaces.

(10) The front floor panel according to any one of items (1) to (9), wherein the convex-concave part is formed by press-forming a metal sheet.

(11) The front floor panel according to item (10), wherein the metal sheet is a steel sheet with a sheet thickness t (mm) before forming of at most 0.65 mm.

(12) The front floor panel according to item (10), wherein the metal sheet is an aluminum alloy sheet with a sheet thickness t (mm) before forming of 0.5 mm to 2.0 mm.

(13) The front floor panel according to any one of items (9) to (12), wherein a ratio (L/t) of a length L (mm) of one side of the unit area composed of the virtual square, and the sheet thickness t (mm) is 10 to 2000.

(14) The front floor panel according to any one of items (9) to (13), wherein when a length of a short side of a rectangular shape formed of the area divided at the ratio B is defined as BL (mm) with respect to the length L (mm) of the one side of the unit area composed of the virtual square, $0.2L \leq BL \leq 0.6L$ is satisfied.

(15) The front floor panel according to any one of items (9) to (14), wherein a ratio (H1/t) of a projection height H1 (mm) of the first area and the sheet thickness t (mm), and a maximum inclination angle $\theta_1(°)$ formed of the first side surface and the intermediate reference plane satisfy a relationship of $1 \leq (H1/t) \leq 3\theta_1 + 272$, and a ratio (H2/t) of a protrusion height H2 (mm) of the second area and the sheet thickness t (mm), and a maximum inclination angle $\theta_2(°)$ formed of the second side surface and the intermediate reference plane satisfy a relationship of $1 \leq (H2/t) \leq -3\theta_2 + 272$.

Note that in regard with the arts disclosed in Patent Documents 4 to 9, the improvement in stiffness by the convex-concave part in the front floor panel according to the present invention is much higher than the improvement in stiffness by the convex-concave parts that isotropically increase the stiffness of the sheet materials or the panels for automotive component members disclosed in Patent Documents 4 to 9. Accordingly, in order to reduce the sheet thickness of the sheet materials or the panels for automotive component members disclosed in Patent Documents 4 to 9, the convex-concave part has to be formed in wider region of the sheet materials or the panels for automotive component members.

More particularly, the present invention can increase stiffness of an aluminum alloy sheet with a sheet thickness of 0.3 mm 15.4-fold to 22.9-fold, for example.

In contrast with the above, the invention disclosed by Patent Document 4 only increases stiffness of an aluminum alloy sheet with a sheet thickness of 0.4 mm approximately three-fold at most, the invention disclosed by Patent Document 5 only increases stiffness of an aluminum alloy sheet with a sheet thickness of 0.3 mm approximately 3.2-fold, and stiffness of an aluminum alloy sheet with a sheet thickness of 0.9 mm approximately 8.4-fold, the invention disclosed by Patent Document 6 only increases stiffness of an aluminum alloy sheet with a sheet thickness of 0.4 mm approximately 1.7-fold to 3.9-fold, the invention disclosed by Patent Document 7 only increases stiffness of an aluminum alloy sheet with a sheet thickness of 0.9 mm approximately 7.1-fold, the invention disclosed by Patent Document 8 only increases stiffness of an aluminum alloy sheet with a sheet thickness of 0.9 mm approximately 9.7-fold, and further, the invention disclosed by Patent Document 9 only increases stiffness of an aluminum alloy sheet with a sheet thickness of 0.3 mm approximately 3.2-fold.

Effect of Invention

According to the present invention, it is possible to provide the front floor provided, which can be reliably press-formed without the load when press forming becoming excessively large, can obtain desired stiffness, and noise and vibration characteristics for all directions since there is little stiffness anisotropy, and is formed from a lightweight metal sheet.

DESCRIPTION OF EMBODIMENTS

Below, the present invention will be described. Note that in the following explanation, FIG. 19 that is referred to as the conventional drawing will be also referred to as necessary. Further, in the present description, none of the expressions of shape, such as "square", are limited to the narrow concepts of geometry; rather, such expressions include shapes that can be generally recognized as those shapes; for example, shapes that would naturally be allowed include shapes wherein the sides are somewhat curved, so-called fillets wherein a round and the like needed for molding is created in a corner part, a surface, and the like, and shapes provided with a so-called curvature. In addition, the expression "parallel" is not limited to the narrow concept of geometry and may be anything that can generally be recognized as being parallel.

Figure 1:
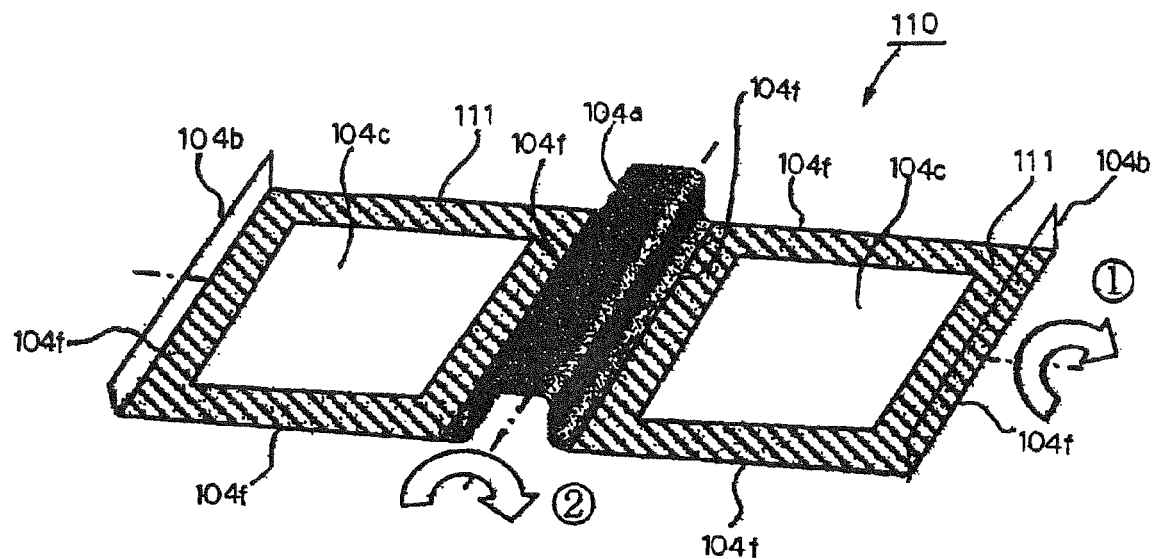
FIG. 1 is an explanatory view schematically showing a formation region of a convex-concave part in a front floor panel according to the present invention in a simplified form.

FIG. 1 is an explanatory view showing a formation region of a convex-concave part 111 in a front floor panel 110 according to the present invention with a part of the formation region in a simplified form. FIGS. 2A to 2D are explanatory views schematically showing other examples of the formation region of the convex-concave part 111. Here, the front floor panel 110 of FIG. 1 corresponds to a front floor panel 104 at an automotive main body lower part shown in FIG. 19.

Figure 19:
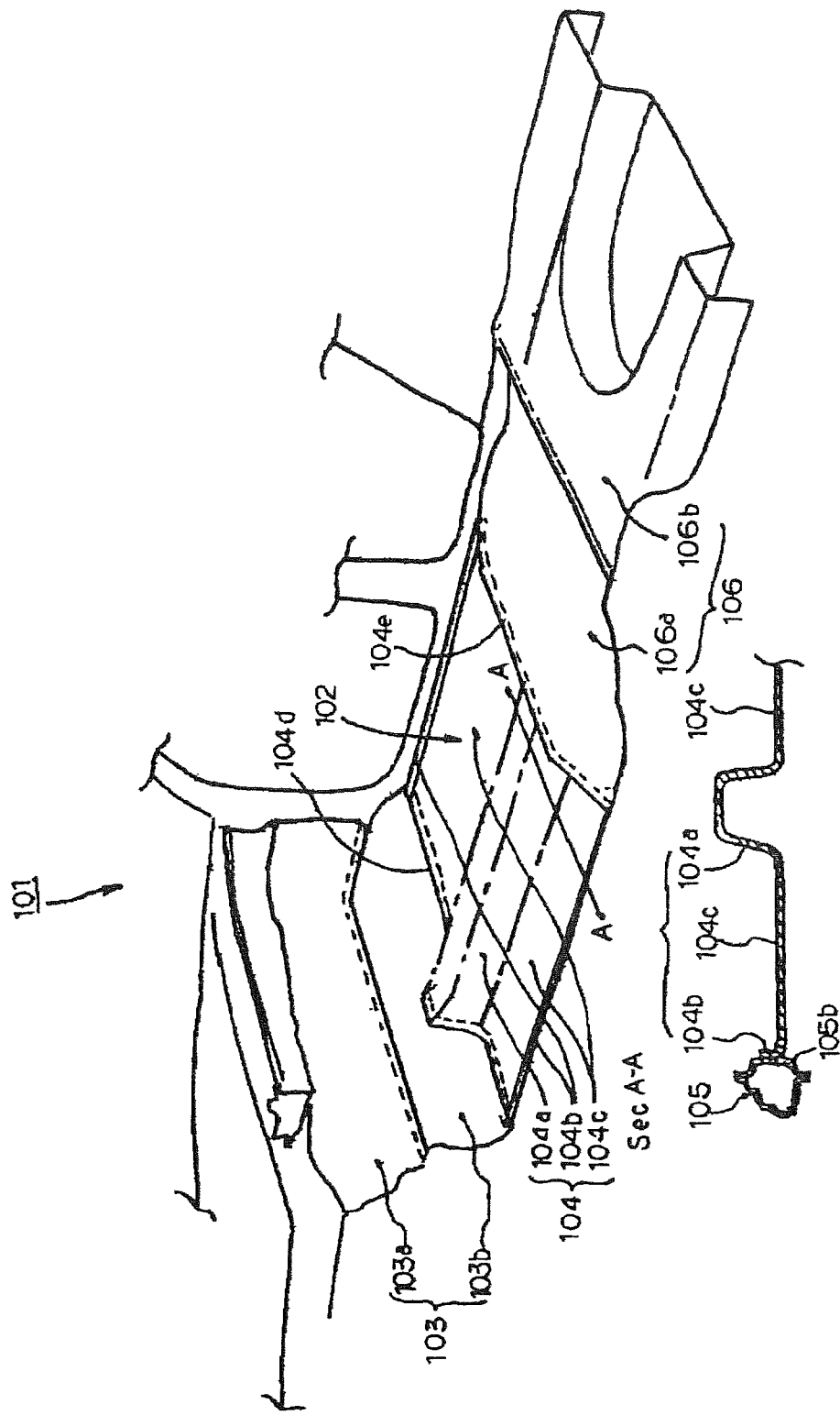
FIG. 19 is an explanatory view showing a schematic structure of a platform of an automotive body in a simplified form.

The front floor panel 110 has a floor tunnel 104a, upright flanges 104b disposed left and right, and left and right plane portions 104c, similarly to the conventional front floor panel 104 shown in FIG. 19. Namely, the front floor panel 110 is a panel of a metal that forms a part of a platform 102 of an automotive body.

The floor tunnel 104a forms a space for storing, for example, a rear end portion of a transmission and a propeller shaft, and further, various kinds of piping, in a center in an automotive width direction.

The upright flanges 104b disposed left and right are respectively formed at left and right end portions in the automotive width direction. The upright flange 104b works as a welding margin for joining the front floor panel to a longitudinal wall surface of a sill inner panel 105b of a side sill 105 of a closed section structure.

The left and right plane portions 104c are formed between the upright flanges 104b disposed left and right and left and right longitudinal wall portions of the floor tunnel 104a. The plane portion 104c is provided with a front seat and the like via a seat cloth member not illustrated.

The platform 102 is configured by overlapping and joining respective edge portions of a dash panel 103 and the aforementioned front floor panel 104 onto each other, and overlapping and joining respective edge portions of the front floor panel 104 and a rear floor panel 106 onto each other.

The dash panel 103 is configured by overlapping and joining respective edge portions of a dash upper panel 103a and a dash lower panel 103b onto each other. The dash panel 103 forms a partition wall between an engine compartment and a cabin. Further, the rear floor panel 106 is configured by overlapping and joining respective edge portions of a rear floor front panel 106a and a rear floor rear panel 106b onto each other.

In the front floor panel 110, the convex-concave parts 111 are formed into loop-shapes in loop-shaped areas (areas shown by hatching in FIG. 1) including eight outer edge portions 104f in total of the respective left and right plane portions 104c.

The convex-concave part 111 is formed into the loop-shape as shown in FIGS. 1 and 2A, and as shown in FIG. 2B, one or two or more convex-concave parts 111-1 may also be formed into loop-shapes in a partial area of a flat sheet-shaped portion. Further, as shown in FIG. 2C, one or two or more convex-concave parts 111-2 may be formed rectilinearly in a partial area of the flat plate-shaped portion, and in this case, as shown in FIG. 2D, convex-concave parts 111-3 and 111-4 that are formed rectilinearly may be formed so as to intersect each other. In the present invention, by adding a convex-concave shape to a part of the front floor panel, other flat portions remain, and therefore, the present invention is effective for attachment or the like of a member such as a cloth member.

The present invention is a front floor panel which is increased in stiffness by the convex-concave shape which will be described as follows, and since forming the convex-concave shape on an entire surface is difficult depending on the kind of a metal, and stiffness and the sheet thickness of the flat sheet, due to the complicated shape of the convex-concave shape of the present invention as described above, stiffness is increased as a whole by forming the convex-concave parts in a part of the front floor panel, in the loop-shape in the example shown in FIG. 1, for example. More specifically, the front floor panel of the present invention can be manufactured by pressing an ordinary flat sheet with use of a die in which the convex-concave shape of the present invention is formed only in the loop-shaped portion of a certain area in a perimeter of the front floor panel, when described with the example shown in FIG. 1. In this case, warm pressing that performs pressing after heating a flat sheet, or a hot stamping method may be adopted. For pressing, the front floor panel can be formed by press forming that uses a pair of dies, and as the specific manufacturing method, preparation of dies and the like, any method that is known in the field can be used. Note that the convex-concave shape also can be formed by the other plastic deformation methods than press forming, such as roll forming that uses a pair of forming rolls in which desired convex-concave shapes are engraved on surfaces thereof, for example.

(Convex-Concave Shape of the Present Invention)

The convex-concave shape of the present invention is formed by combining a first reference area and a second reference area, as will be described later with reference to FIGS. 3 to 6. The first reference area and the second reference area each presents a substantially I shape. As a form thereof, various forms can be taken as shown in examples that will be described later. For example, as in example 1 of the convex-concave part which will be described later, a contour shape in which a longitudinal bar portion and lateral bar portions of the I shape have the same widths may be adopted, or as in example 2 of the convex-concave part, a contour shape in which a width of the longitudinal bar portion of the I shape is larger than widths of the lateral bar portions may be adopted. Further, as shown in example 3 of the convex-concave part, fillets may be provided at corner portions in the substantially I-shaped contour.

The convex-concave part of the present invention is formed by spreading two kinds of unit areas of the first unit area and the second unit area all over, and a state in which a virtual square forming the unit area is divided into three in a lateral direction shows a state in which the square is divided by two straight lines which are drawn from two points that divide one side in the lateral direction forming the square into three, and are parallel with one side in a longitudinal direction, and three areas are formed side by side in the lateral direction.

A state in which the virtual square forming the unit area is divided into three in the longitudinal direction shows a state in which the square is divided by two straight lines which are drawn from two points that divide one side in the longitudinal direction forming the square into three, and are parallel with one side in the lateral direction, and three areas are formed side by side in the longitudinal direction.

A first top surface and a second top surface that are respectively formed of surfaces on a first reference plane and a second reference plane can be formed of regions which protrude in opposite directions to an intermediate reference plane from the first reference plane and the second reference plane. As shapes of the protruded regions, dome shapes, ridge shapes, conical shapes and the like are cited as examples, but the shapes of the protruded regions are not limited to them. Further, in addition thereto, from the protruded region, the region may be protruded in an opposite direction (a direction to the intermediate reference plane) to the protruded direction.

The first reference area and the second reference area in the front floor panel 110 having the convex-concave part 111 may be configured by connecting a first divided area and a second divided area respectively, and thereafter, deforming parts of corner portions of both of them into circular arc shapes in such a manner that areas of both of them do not change.

Here, the corner portions mean corner portions to be convex corners in a contour line of the first reference area, and corner portions to be convex corners in a contour line of the second reference area. Since the corner portions of convex-concave shape of the front floor panel 110 having the convex-concave part 111 can be formed into smooth shapes, forming of the convex-concave part 111 becomes easy, and expansion of range of application and improvement in a design quality are achieved.

Figure 4:
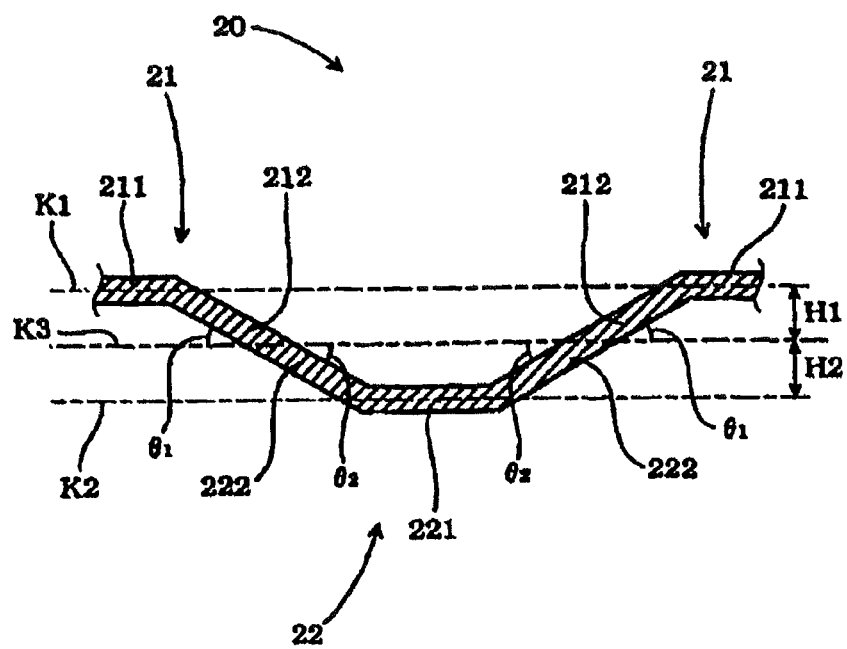
FIG. 4 is a partial enlarged view of a cross section taken along the A-A line in FIG. 3.

As shown in FIG. 4, in the front floor panel 110 having the convex-concave part 111, an inclination angle $\theta_1(°)$ of a first side surface relative to the intermediate reference plane, and an inclination angle $\theta_2(°)$ of a second side surface relative to the intermediate reference plane are preferably within a range of 10 to 90° in order to obtain the convex-concave shape having excellent stiffness improvement while ensuring formability.

If the inclination angle $\theta_1(°)$ of the first side surface or the inclination angle) $\theta_2(°)$ of the second side surface is less than 10°, it becomes difficult to make the projection heights of the respective first area and second area large, and stiffness improvement ratio is reduced. Further, when the inclination angle $\theta_1(°)$ of the first side surface or the inclination angle $\theta_2(°)$ of the second side surface exceeds 90°, it becomes difficult to form the convex-concave shape.

Note that in the case of press-forming a metal sheet, upper limit values of the inclination angle $\theta_1(°)$ of the first side surface and the inclination angle $\theta_2(°)$ of the second side surface are more preferably at most 70° from the viewpoint of formability. Accordingly, the inclination angle $\theta1(°)$ of the first side surface and the inclination angle $\theta2(°)$ of the second side surface are more preferably 10 to 70°.

The first side surface and the second side surface are formed of a plurality of surfaces. All of the surfaces do not have to have the same inclination angles, and the different inclination angles may be formed depending on the regions. However, all of the inclination angles are preferably within the aforementioned preferable range.

At least some or all of the first reference plane, the intermediate reference plane and the second reference plane that are sequentially arranged in the front floor panel 110 having the convex-concave part 111 are preferably formed of parallel curved surfaces. Thereby the front floor panel 110 having the excellent convex-concave part 111 having high stiffness can be deformed into various shapes, and the range of application of the front floor panel 110 is expanded.

In the front floor panel 110, the convex-concave part 111 is preferably formed by press-forming a metal sheet. In this case, besides cold press forming, warm pressing and hot stamping method that perform press forming after the temperature of the metal sheet is raised may be adopted.

By applying plastic deformation such as press forming such as embossing and roll forming to a metal sheet, the convex-concave part 111 is easily formed. Even when press forming is performed after the temperature of the metal sheet is raised like warm pressing and a hot stamping method, the convex-concave part 111 can be easily formed. Therefore, when the front floor panel 110 is formed from a metal sheet, the convex-concave part 111 is relatively easily formed. Various metal sheets that are plastically deformable, such as an aluminum alloy sheet, a steel sheet and a copper alloy sheet are exemplified as the metal sheet.

In manufacturing the front floor panel 110, casting, cutting and the like can be adopted, besides the above described plastic deformation.

The front floor panel 110 may be formed from other materials than a metal as long as the front floor panel 110 has the convex-concave part 111. The front floor panel 110 also can be formed from a resin sheet, for example. The convex-concave part 111 of the front floor panel 110 made of a resin is formable by injection forming, hot pressing or the like. Since the front floor panel 110 made of a resin has less limitation in forming than the front floor panel 110 made of a metallic material, flexibility in design is improved.

A sheet thickness t (mm) before forming of the metal sheet that is a starting material of the front floor panel 110 having the convex-concave part 111 is preferably at most 0.65 mm in the case of a steel sheet, and is preferably 0.5 to 2.0 mm in the case of an aluminum alloy sheet. If the sheet thickness of the metal sheet of an aluminum alloy sheet is less than 0.5 mm, there is a risk that the stiffness that will be required as the front floor panel will be insufficient, and if the sheet thickness of the metal sheet of an aluminum alloy sheet exceeds 2.0 mm, there is a risk that forming of the convex-concave part 111 will become difficult.

A ratio (L/t) of a length L (mm) of one side of the unit area such as the first unit area and the second unit area, and the sheet thickness t (mm) of the metal sheet in the front floor panel 110 having the convex-concave part 111 is preferably 10 to 2000. If the ratio (L/t) is less than 10, there is a risk that forming of the convex-concave part 111 will be difficult, whereas if the ratio (L/t) exceeds 2000, there is a risk that the sufficient convex-concave part 111 cannot be formed, and stiffness that is required as the front floor panel will be insufficient.

When a length of a short side of a rectangular shape that is formed of an area divided at a ratio B is designated as BL (mm) with respect to the length L (mm) of the one side of the square, in the front floor panel 110, a relationship of $0.2L \leq BL \leq 0.6L$ is preferably satisfied. If the relationship of $0.2L \leq BL \leq 0.6L$ is not satisfied, there is a risk that forming of the convex-concave part 111 will be difficult.

It is preferable in the front floor panel 110 having the convex-concave part 111 that a ratio (H1/t) of a projection height H1 (mm) of the first area and the sheet thickness t (mm), and the maximum inclination angle $\theta_1(°)$ formed of the first side surface and the intermediate reference plane satisfy a relationship of $1 \leq (H1/t) \leq -3\theta_1 + 272$, and a ratio (H2/t) of a projection height H2 (mm) of the second area and the sheet thickness t (mm), and the maximum inclination angle $\theta_2(°)$ formed of the second side surface and the intermediate reference plane satisfy a relationship of $1 \leq (H2/t) \leq -3\theta_2 + 272$.

If the above described ratio (H1/t) is less than 1, there is a risk that the effect of improving stiffness by forming the first area will not be sufficiently obtained, and if the above described ratio (H1/t) exceeds $-3\theta_1 + 272$, there is a risk that forming of the convex-concave part 111 will be difficult. Similarly, if the above described ratio (H2/t) is less than 1, there is a risk that the effect of improving stiffness by forming the second area will not sufficiently obtained, and if the above described ratio (H2/t) exceeds $-3\theta_2 + 272$, there is a risk that forming of the convex-concave part 111 will be difficult.

Next, examples 1 to 3 of the convex-concave part will be described.

Example 1 of Convex-Concave Part

Figure 2:
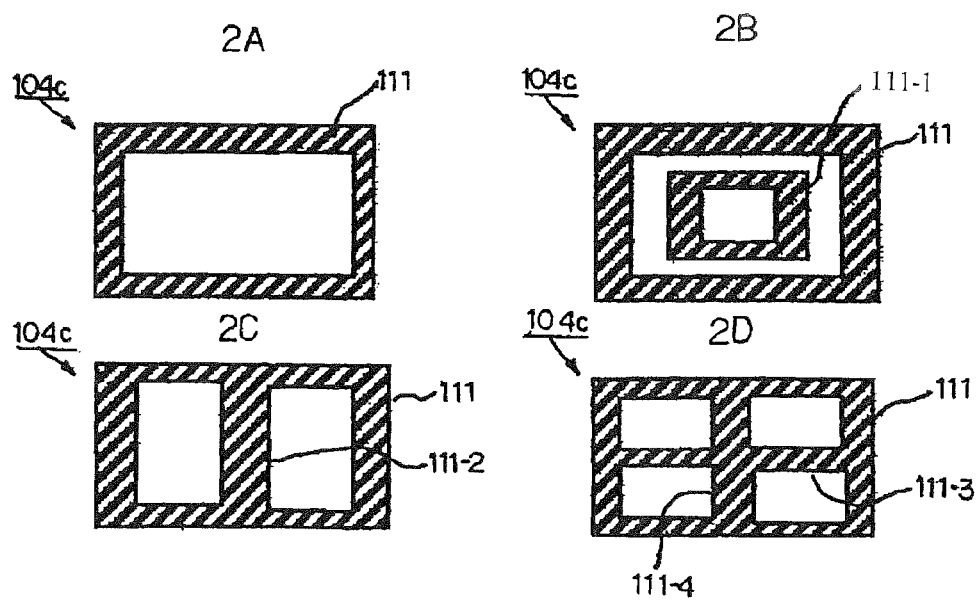
FIG. 2A is an explanatory view showing the formation region of the convex-concave part.
FIG. 2B is an explanatory view showing the formation region of the convex-concave part.
FIG. 2C is an explanatory view showing the formation region of the convex-concave part.
FIG. 2D is an explanatory view showing the formation region of the convex-concave part.
Figure 3:
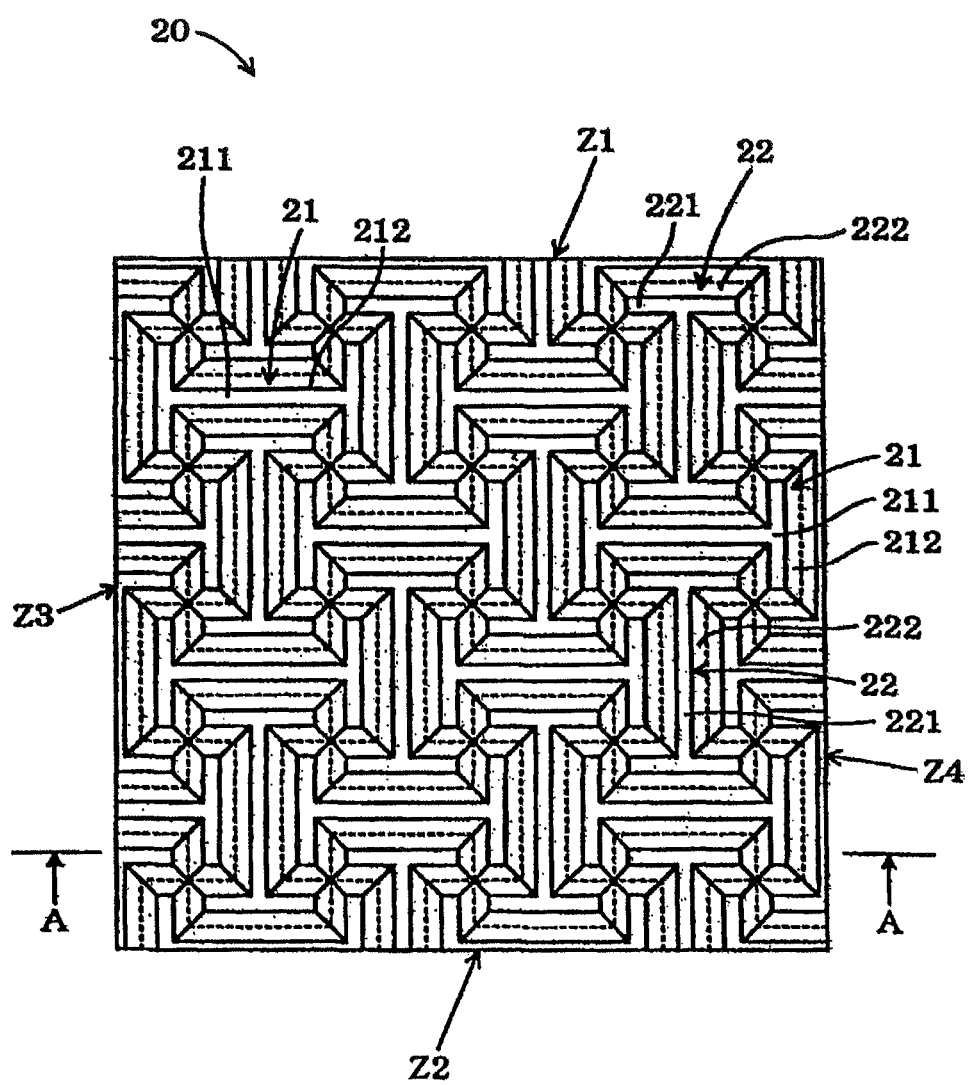
FIG. 3 is a partial plan view showing a convex-concave part of example 1.

A front floor panel 110 having a convex-concave part 20 according to an example of the present invention will be described with reference to FIGS. 3 to 6. Here, the convex-concave parts 20 shown in FIGS. 3, 4 and 6 are views in which part of the convex-concave parts 111, 111-1, 111-2, 111-3 and 111-4 shown in FIGS. 1 and 2 is enlarged to make a detailed structure thereof understandable. Accordingly, the numbers and dimensions of the respective unit areas are not limited to those illustrated in the respective drawings.

FIG. 3 is a partial plan view showing the convex-concave part 20 of example 1. In FIG. 3, portions that are contours of a first area 21 and a second area 22 in the intermediate reference plane and do not appear as external shape lines are shown by broken lines. The same applies to FIG. 5 that will be described later.

Figure 5:
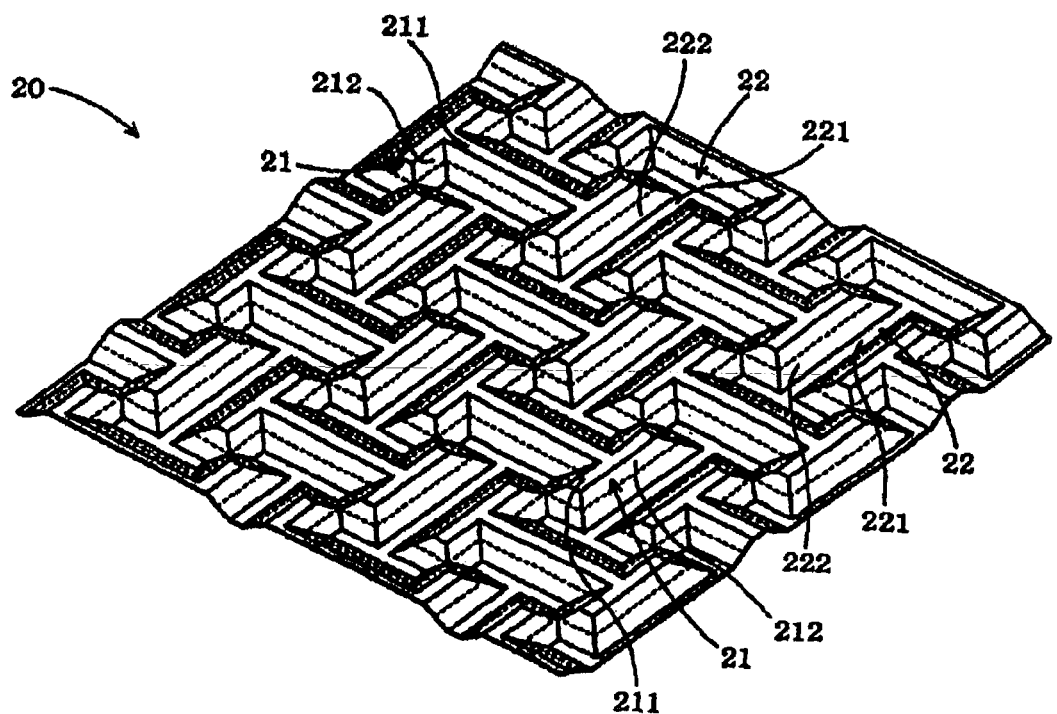
FIG. 5 is a perspective view showing a convex-concave part of the example.
Figure 6:
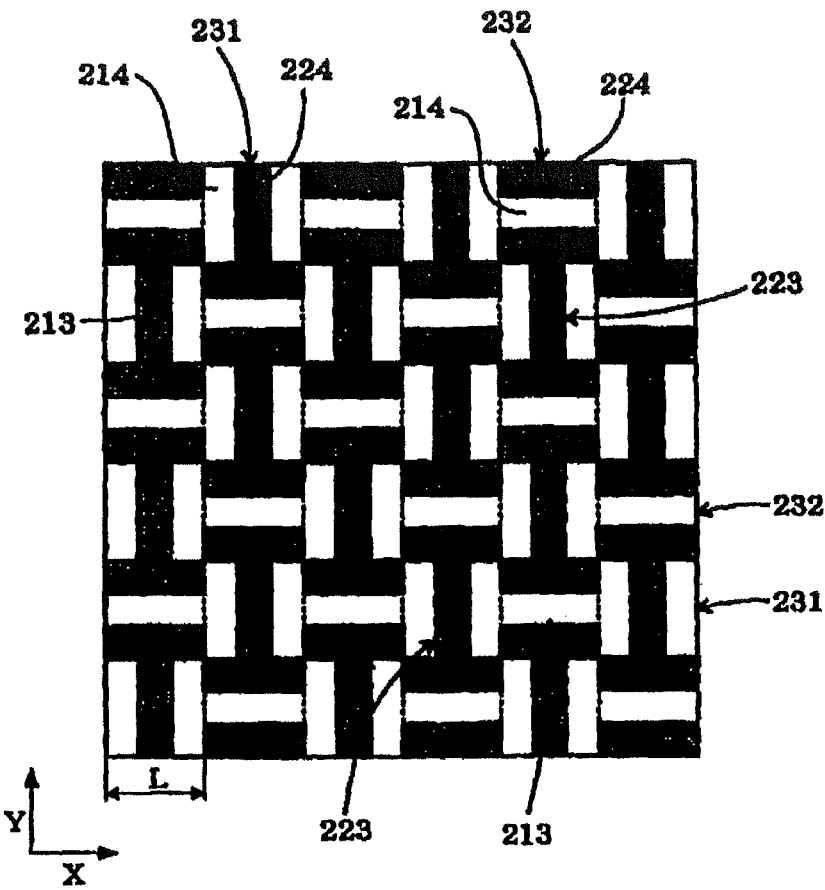
FIG. 6 is an explanatory view showing the convex-concave part of the example.

FIG. 4 is a partial enlarged view of an A-A section of FIG. 3, and FIG. 5 is a perspective view showing the convex-concave part 20 of example 1.

FIG. 6 is an explanatory view showing the convex-concave part of example 1. FIG. 6 shows a shape of the convex-concave part 20 of the front floor panel 110 by disposition of a first reference area 213 and a second reference area 223 with an intermediate reference plane K3 as a reference. The same applies to FIGS. 10 and 11 that will be described later.

The front floor panel 110 having the convex-concave part 20 as shown in FIGS. 3 to 6 has the stiffness increased by having the convex-concave part 20.

The convex-concave part 20 is configured as enumerated below.

The convex-concave part 20 is defined with three reference planes that are a first reference plane K1, the intermediate reference plane K3 and a second reference plane K2 as references. The first reference plane K1, the intermediate reference plane K3 and the second reference plane K2 are sequentially disposed in parallel to be spaced in a sheet thickness direction (a longitudinal direction in FIG. 4), as shown in FIG. 4.

As shown in FIG. 6, the intermediate reference plane K3 is defined as the plane in which first unit areas 231 and second unit areas 232 that are virtual squares are spread all over. One of two directions along sides of the virtual square is defined as a lateral direction (an X direction), and the other one is defined as a longitudinal direction (a Y direction).

The first unit area 231 is divided into three at a ratio of A:B:A=1:1:1 with respect to the lateral direction (the X direction). Two areas divided at a ratio A are defined as first divided areas 214, and one area divided at a ratio B is defined as a second divided area 224.

The second unit area 232 is divided into three at a ratio of A:B:A=1:1:1 with respect to the longitudinal direction (the Y direction). Two areas that are divided at the ratio A are defined as the second divided areas 224, and one area divided at the ratio B is defined as the first divided area 214.

In the intermediate reference plane K3, the first unit areas 231 and the second unit areas 232 are alternately disposed in the longitudinal direction and the lateral direction. An area having a substantially I shape that is formed of the adjacent first divided areas 214 is defined as the first reference area 213, whereas an area having a substantially I shape that is formed of the adjacent second divided areas 224 is defined as the second reference area 223.

The convex-concave part 20 includes the first area 21 and the second area 22 as shown in FIGS. 3 to 5. The first area 21 is formed so as to protrude toward the first reference plane K1 from the first reference area 213 that is defined on the intermediate reference plane K3. The second area 22 is formed so as to protrude toward the second reference plane K2 from the second reference area 223 defined on the intermediate reference plane K3.

The first area 21 is formed of a first top surface 211 and a first side surface 212. The first top surface 211 is formed by projecting the first reference area 213 into the first reference plane K1 at either unity or reduction magnification. The first side surface 212 is formed by connecting a contour of the first top surface 211 and a contour of the first reference area 213.

The second area 22 is formed of a second top surface 221 and a second side surface 222. The second top surface 221 is formed by projecting the second reference area 223 into the second reference plane K2 at either unity or reduction magnification. The second side surface 222 is formed by connecting a contour of the second top surface 221 and a contour of the second reference area 223.

As shown in FIG. 4, the three reference planes that are the first reference plane K1, the intermediate reference plane K3 and the second reference plane K2 in example 1 are planes that are parallel with one another. Further, the first top surface 211 has a sheet thickness center thereof located in a position corresponding to the first reference plane K1, and the second top surface 221 has a sheet thickness center thereof disposed in a position corresponding to the second reference plane K2. A distance formed of the first reference plane K1 and the intermediate reference plane K3 is designated as the projection height H1 (mm), and a distance formed of the second reference plane K2 and the intermediate reference plane K3 is designated as the projection height H2 (mm).

Further, in example 1, the shapes and the dimensions of the first area 21 and the second area 22 are the same, but only the protruding directions thereof differ. The projection height H1 (mm) of the first area 21 and the projection height H2 (mm) of the second area 22 are both 1.5 mm.

Further, a starting material of the front floor panel 110 having the convex-concave part 20 of example 1 is a flat sheet made of an aluminum alloy with a sheet thickness t=0.30 mm.

The convex-concave part 20 is formed by press forming using a pair of dies. Note that the convex-concave part 20 may be formed by other plastic deformation methods than press forming, such as roll forming using a pair of forming rolls in which desired convex-concave shapes are engraved on surfaces, for example.

As shown in FIG. 4, the inclination angle $\theta_1$(°) of the first side surface 212 relative to the intermediate reference plane K3, and the inclination angle $\theta_2$(°) of the second side surface 222 relative to the intermediate reference plane K3 are both 30°. The first side surface 212 and the second side surface 222 have no bent portion but are formed continuously by one plane.

As shown in FIG. 6, a length L of one side of the first unit area 231 and the second unit area 232 with the intermediate reference plane K3 as the reference in example 1 is 24 mm.

A ratio (L/t) of the length L (mm) of the one side of the first unit area 231 and the second unit area 232 and the sheet thickness t (mm) of the aluminum alloy sheet is 80, and is within a range of 10 to 2000.

With respect to the length L (mm) of the one side of the first unit area 231 and the second unit area 232, a length BL of a short side of the rectangular shape formed of the area divided at a ratio B is 8 mm, and is within a range of 4.8≤BL≤14.4.

A ratio (H1/t) of the projection height H1 (mm) of the first area 21 and the sheet thickness t (mm) is 5. Further, the inclination angle $\theta_1$ formed of the first side surface 212 and the intermediate reference plane K3 is 30°, and $-3\theta_1+272=182$. Accordingly, the relationship of $1 \leq (H1/t) \leq -3\theta_1+272$ is satisfied.

Similarly, a ratio (H2/t) of the projection height H2 (mm) of the second area 22 and the sheet thickness t (mm) is 5. Further, the inclination angle $\theta_2$ that is formed of the second side surface 222 and the intermediate reference plane K3 is 30°, and $-3\theta_2+272=182$. Accordingly, the relationship of $1 \leq (H2/t) \leq -3\theta_2+272$ is satisfied.

The front floor panel 110 of example 1 has the convex-concave part 20 in the peculiar shape as described above. Namely, the convex-concave part 20 has the first area 21 that protrudes toward the first reference plane K1 from the first reference area 213 defined with the intermediate reference plane K3 as the reference, and the second area 22 that protrudes toward the second reference plane K2 from the second reference area 223 defined on the intermediate reference plane K3. The first area 21 is formed of the first top surface 211, and the first side surface 212 that is formed by connecting the contour of the first top surface 211 and the contour of the first reference area 213. Further, the second area 22 is formed of the second top surface 221, and the second side surface 222 that is formed by connecting the contour of the second top surface 221 and the contour of the second reference area 223.

The first area 21 and the second area 22 are formed of the first top surface 211 and the second top surface 221 that are disposed in positions separated in the thickness direction of the front floor panel 110, and the first side surface 212 and the second side surface 222 that are disposed to intersect in the thickness direction of the front floor panel 110. As such, in the convex-concave part 20, most of the sheet material is disposed in the positions separated from a neutral plane in the sheet thickness direction of the front floor panel 110, such as a top surface portion. Therefore, by having many portions separated from the neutral plane, the material is effectively used as a strength member, and therefore, both stiffness and energy absorption characteristics can be significantly improved.

Further, an area of the first reference area 213 and an area of the second reference area 223 are the same. Further, the inclination angles $\theta_1$ and $\theta_2$ that are formed of the first side surface 212 and the second side surface 222 with respect to the intermediate reference plane K3 are made the same, and the projection heights H1 and H2 of the first area 21 and the second area 22 are made the same. Therefore, shapes of the first area 21 and the second area 22 that protrude to a front and a back of the front floor panel 110 are also the same. Accordingly, stiffness can be improved more effectively.

Further, attendant with the increase in the stiffness, it is also possible to obtain the effect of improving damping characteristics; in addition, the concave-convex shape makes it possible to obtain the effect of suppressing sound reverberations.

In order to quantitatively determine the stiffness increase effect of the front floor panel 110 of example 1, a bending stiffness evaluation of a cantilevered beam was performed by FEM analysis, and bending stiffness evaluation by a three-point bending test was performed.

[FEM Analysis]

In order to quantitatively determine the stiffness increase effect and the energy absorption characteristics of the front floor panel 110 of example 1, FEM analysis was performed and bending stiffness evaluation of a cantilevered beam was performed.

In the FEM analysis on the bending stiffness evaluation of a cantilevered beam, one ends (Z1, Z3) were designated as fixed ends, while the other ends (Z2, Z4) were designated as free ends, and a deflection amount of the front floor panel 110 that was a test piece at the time of exerting a load of 1N onto a central portion of the other ends (Z2, Z4) that are the free ends was obtained.

The test piece has a rectangular shape of 120 mm by 120 mm, and the shapes of the convex-concave part 20 shown in example 1 were formed on the entire surface for the purpose of explanation. The convex-concave shape was formed by changing an angle formed of one side of the test piece and one side of the virtual square in the above described unit area to the respective directions of 0, 15, 30, 45, 60, 75 and 90°. Further, the sheet thickness t after sheet forming was designated as 0.274 mm by taking the increase in the surface area into consideration. Note that the fixed end Z1 and the free end Z2 shown in FIG. 3 show the fixed end and the free end in the direction of 0 degrees, and the fixed end Z3 and the free end Z4 show the fixed end and the free end in the direction of 90°.

The evaluation was performed by comparing the amount of deflection obtained by conducting the same FEM analysis on the flat sheet shaped original sheet whereon the concave-convex part 20 is not formed.

Figure 7:
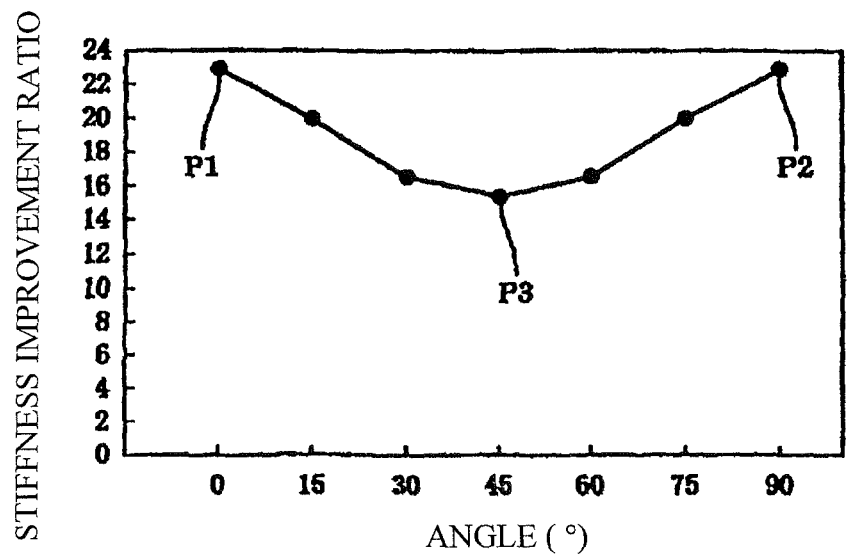
FIG. 7 is a graph showing a stiffness improvement ratio of a convex-concave part by a cantilever of the example.

FIG. 7 is a graph showing the stiffness improvement ratio of the convex-concave part of a cantilevered beam of example 1, and shows the result of the FEM analysis with the above described angle plotted on the horizontal axis and the improvement ratio of the bending stiffness plotted on the vertical axis.

As shown in the graph of FIG. 7, it has become clear that the improvement ratio (P1, P2) of stiffness in the 0° direction and the 90° direction are 22.9 and the highest, the improvement ratio (P3) of stiffness in the 45° direction is 15.4 times, and the lowest, and the shape of the convex-concave part 20 of example 1 has a very high improvement ratio of stiffness in any direction of the forming directions.

[Three-Point Bending Test]

Figure 8:
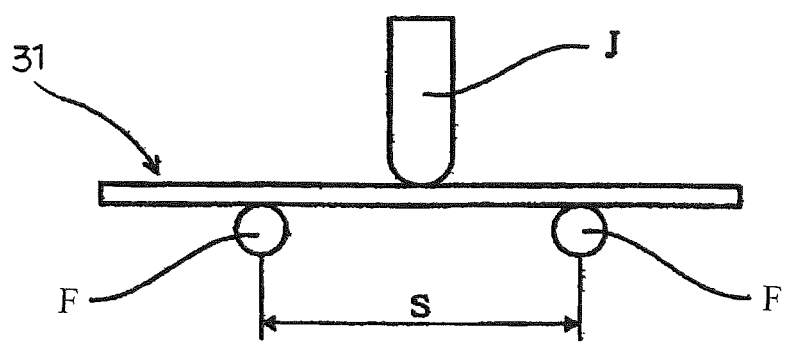
FIG. 8 is an explanatory view showing a test procedure of the example.

FIG. 8 is an explanatory view showing a test procedure of the three-point bending test of example 1.

As shown in FIG. 8, in the three-point bending test, a test piece 31 having the convex-concave shape of the present invention was disposed on two fulcrums F configured by disposing two cylindrical support members lying on their sides in parallel so that an inter-fulcrum distance S=120 mm is satisfied, a load was exerted on a center in a lengthwise direction of the test piece 31 by a pressing jig J in a flat sheet shape with a front end section forming a semicircle, and a displacement amount of the test piece 31 was measured. Evaluation was made by performing a similar three-point bending test with respect to the original sheet in a flat sheet shape without forming the convex-concave shape, and comparing the load-displacement diagrams.

The test piece 31 was an A1050-O material with the shape before forming being 100 mm×150 mm, and the sheet thickness t=0.3 mm, and the convex-concave part 20 shown in example 1 was formed on the entire surface as a matter of convenience. The forming direction of the convex-concave shape in the test piece 31 is similar to the cases of the 0° direction and the 45° direction in the FEM analysis in the above described cantilever.

Figure 9:
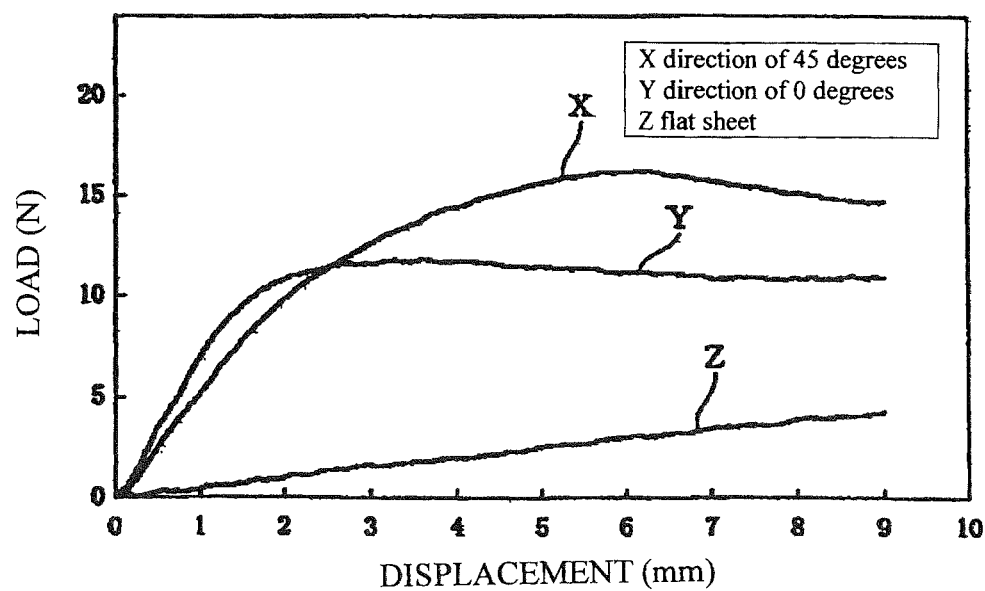
FIG. 9 is a graph showing a result of the example.

FIG. 9 is a graph showing a result of the three-point bending test of example 1, and is a load-displacement diagram with the load obtained from the result of the three-point bending test plotted on the ordinate and the displacement plotted on the abscissa.

In the same drawing, a solid line X shows a measurement result in the case of the convex-concave shape being provided in the 45° direction, a solid line Y shows a measurement result in the case of the convex-concave shape being provided in the 0° direction, and a solid line Z shows a measurement result of the original sheet in a flat sheet shape.

As shown by the graph of FIG. 9, in the solid line X, the inclination angle at startup is 12.1 times as compared with the solid line Z. Accordingly, it has been clear that the bending stiffness in the case of the convex-concave shape being provided in the 45° direction is improved to be 12.1 times as compared with the original sheet in a flat sheet shape. Further, in the solid line Y, the inclination angle at startup becomes 15.4 times as compared with that of the solid line Z. Accordingly, it has been clear that the bending stiffness in the case of the convex-concave shape being provided in the 0° direction is improved to be 15.4 times as compared with that of the original sheet in a flat sheet shape.

Further, a product of the load and displacement is an energy amount (work load) that deforms the test piece 31. Therefore, as shown in the load-displacement diagram of FIG. 9, it has been found out that in the solid line X and the solid line Y, the energy amounts required for deformation are high as compared with that of the solid line Z. Accordingly, it has been clear that the convex-concave shape of example 1 significantly improves in the energy absorption amount with respect to the original sheet in a flat sheet shape.

Example 2 of Convex-Concave Part

Figure 10:
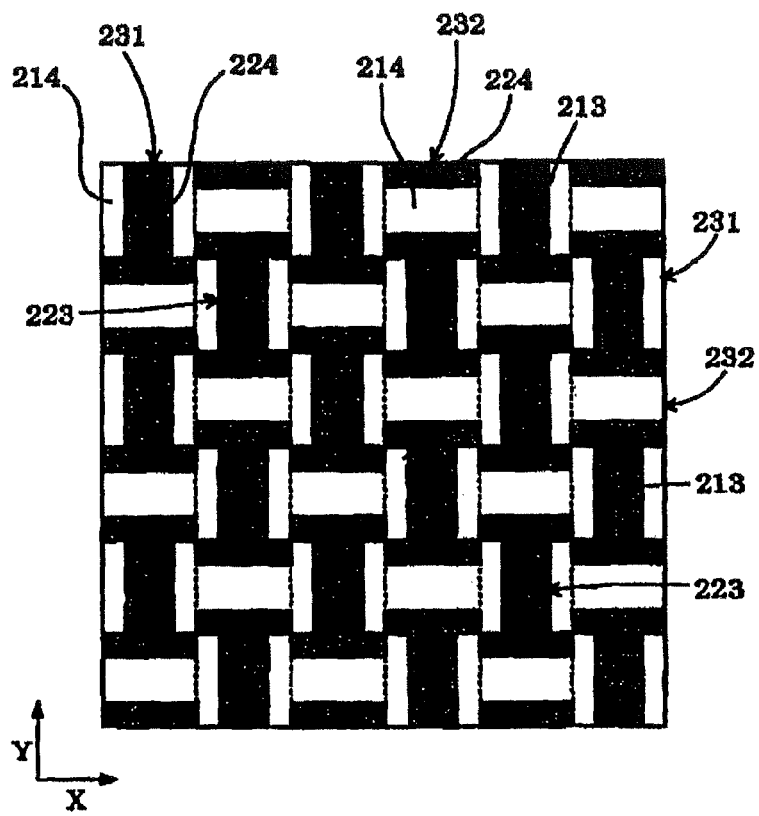
FIG. 10 is an explanatory view showing a convex-concave part in an example.

FIG. 10 is an explanatory view showing a convex-concave part in example 2, and is a view expressing a convex-concave shape with the intermediate reference plane K3 as a reference.

As shown in FIG. 10, example 2 is a modification of the front floor panel 110 having the convex-concave part 20 of example 1.

The front floor panel 110 having the convex-concave part 20 that is expressed with the intermediate reference plane K3 as a reference shown in FIG. 10 is an example in which the ratio of divisions in the first unit area 231 and the second unit area 232 are changed.

The first unit area 231 is divided into three at a ratio of A:B:A=1:2:1 in the lateral direction. An area divided at a ratio A is defined as the first divided area 214, and an area divided at a ratio B is defined as the second divided area 224.

The second unit area 232 is divided into three at a ratio of A:B:A=1:2:1 in the longitudinal direction. An area divided at a ratio A is defined as the second divided area 224, and an area divided at a ratio B is defined as the first divided area 214.

Note that the front floor panel 110 having the convex-concave part 20 of example 2 has the first area 21 and the second area 22 that protrude respectively to the first reference plane K1 and the second reference plane K2 from the first reference area 213 and the second reference area 223 that are defined based on the intermediate reference plane K3 shown in FIG. 10. The other configuration is similar to that of example 1.

Example 2 exhibits an operational advantage similar to example 1.

Example 3 of Convex-Concave Part

Figure 11:
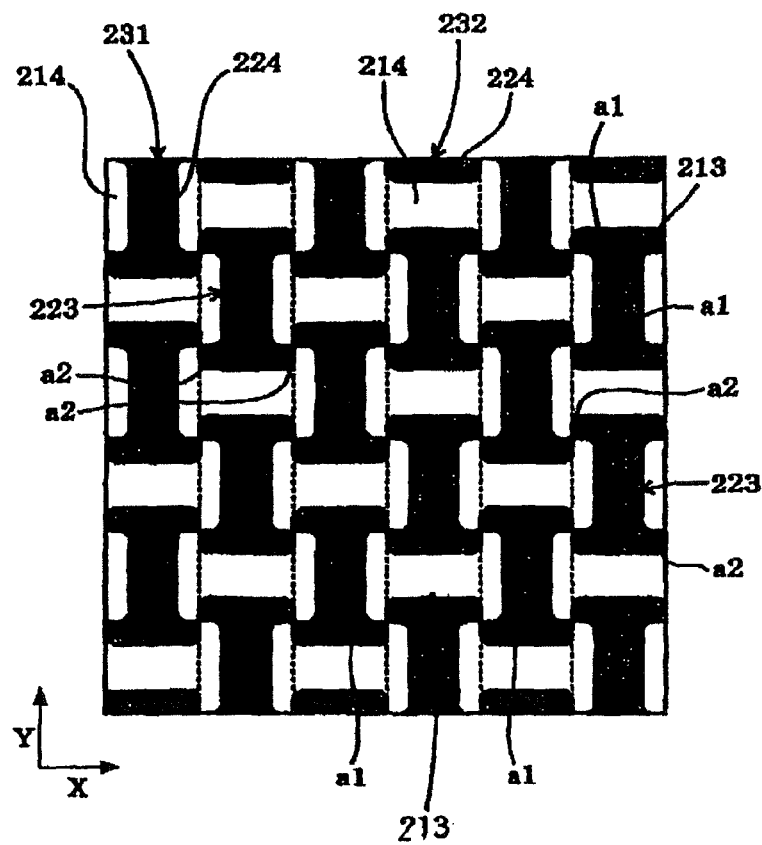
FIG. 11 is an explanatory view showing a convex-concave part in an example.

FIG. 11 is an explanatory view showing the convex-concave part 20 in example 3.

As shown in FIG. 11, example 3 is such that in the front floor panel 110 having the convex-concave part 20 of example 2, after the first reference area 213 and the second reference area 223 are defined with the intermediate reference plane K3 as a reference, parts of the corner portions of both of them are deformed into circular arc shapes in such a manner that the areas of both of them do not change.

More specifically, as shown in FIG. 11, four convex corner portions a1 formed of a contour line of the first reference area 213, and four convex corner portions a2 formed of the second reference area 223 are all deformed into circular arc shapes.

In example 3, the convex-concave shape that protrudes to the first reference plane K1 and the second reference plane K2 from the first reference area 213 and the second reference area 223 shown in FIG. 11 is formed. The other configuration is similar to example 1.

Since in example 3, the shape of the corner portions of convex-concave of the front floor panel 110 having the convex-concave part 20 is made smooth, forming is facilitated, and expansion of use and improvement in a design quality are achieved.

Example 3 has an operational advantage similar to those of example 1 with respect to the other configuration.

Figure 12:
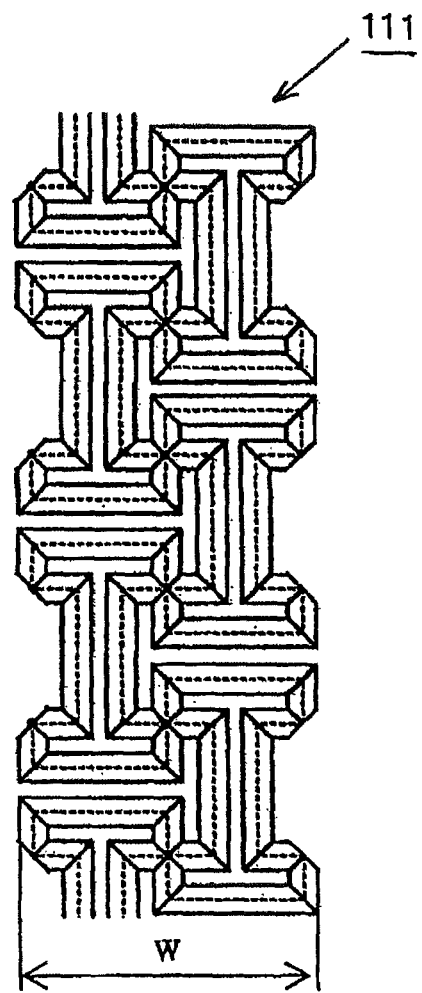
FIG. 12 is an explanatory view showing a minimum unit of the convex-concave part.

FIG. 12 is a view explaining the minimum convex-concave part 20 that exhibits the advantage as the convex-concave shape of the present invention. Namely, the convex-concave shape of the present invention increases stiffness by a plurality of unit areas being arranged, and to what extent at the minimum the unit areas are arranged to obtain the advantage of the present invention will be described with reference to FIG. 12.

As shown in FIG. 12, the convex-concave part 111 of the present invention needs to have two or more rows of the areas each having the substantially I shape. Namely, the loop-shaped convex-concave part 111 shown in FIG. 1 can obtain minimum necessary stiffness if the convex-concave part 111 has two or more rows of the areas each having at least the substantially I shape. More preferably, the area of the loop-shaped convex-concave part 111 is formed to be at least 40% of the area of the plane portion 104c. As the disposition method of the substantially I shapes in this case, the substantially I shapes may be continuously disposed one by one in the width direction W to make two rows, or 0.5 of the substantially I shape, one substantially I shape, and 0.5 of the substantially I shape may be disposed continuously in the width direction W to make two rows in total, when the convex-concave part has two rows of the substantially I shapes, for example.

The sheet thickness of the conventional front floor panel made of steel is approximately 0.65 mm. Since the front floor panel 110 according to the present invention has the loop-shaped convex-concave part 111 in the plane portion 104c, and therefore, has high stiffness, even if the sheet thickness is made as thin as approximately 0.55 mm, the front floor panel 110 has stiffness equivalent to that of the conventional front floor panel without using an additional steel member.

Since in the front floor panel 110, the convex-concave part 111 is formed at the forming bottom dead center in the press process, and the convex-concave part 111 is formed on a part of the plane portion 104c, instead of a whole of the plane portion 104c, the forming load required upon press forming is prevented from becoming extremely high, and the convex-concave part 111 can be formed at the forming bottom dead center in the press process, whereby the front floor panel 110 having the convex-concave part 111 can be efficiently manufactured.

Further, since in the front floor panel 110, the convex-concave part 111 is formed in the loop-shaped area including an outer edge portion 104f of the plane portion 104c, the stiffness of the front floor panel 110 in which the convex-concave part 111 is formed does not have anisotropy, and therefore, desired stiffness and noise and vibration characteristics can be reliably obtained.

Example 1

The present invention will be described more specifically with reference to an example. In the present example, the present invention is applied to a steel sheet, but the present invention is not limited to this, and can be applied to any of the materials that are known in the present technical field including the aforementioned aluminum. Accordingly, the advantage of the present invention is also provided in the case that the present invention is applied to an aluminum alloy sheet, for example, and is similar to the case in which the present invention is applied to a steel sheet. Therefore, explanation of the case of the present invention being applied to an aluminum alloy sheet will be omitted.

Figure 13:
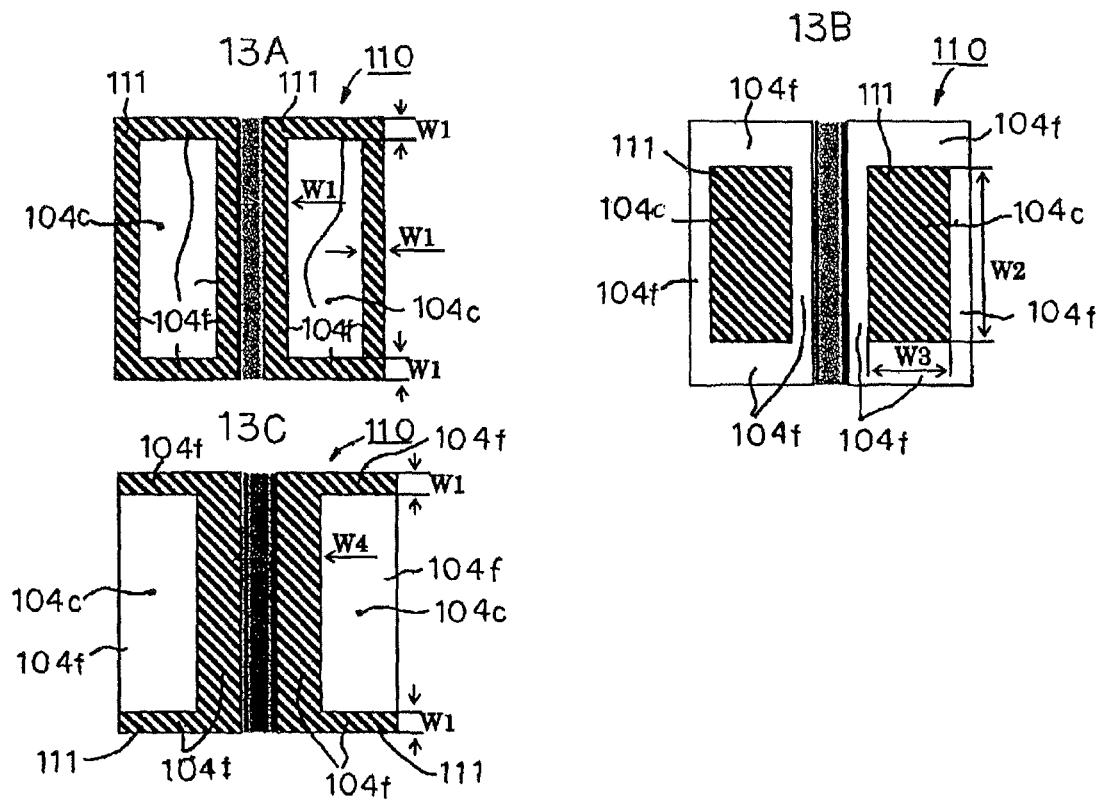
FIG. 13A is an explanatory view showing an analysis model X in which the convex-concave parts are formed in edges (hatching portions in FIGS. 1 and 13A) of the plane portions of the front floor panel shown in FIG. 1.
FIG. 13B is an explanatory view showing an analysis model Y in which the convex-concave parts are formed in the centers (parts except for the hatching portions in FIG. 1, a hatching portion in FIG. 13B) of the plane portions of the front floor panel shown in FIG. 1.
FIG. 13C is an explanatory view showing an analysis model Z in which the convex-concave parts are formed into C-shapes in the edges of the plane portions of the front floor panel shown in FIG. 1.

FIG. 13A is an explanatory view showing an analysis model X in which the convex-concave part 111 is formed on edges (hatching portions in FIGS. 1 and 13A) of the plane portions 104c of the front floor panel 110 shown in FIG. 1. FIG. 13B is an explanatory view showing an analysis model Y in which the convex-concave part 111 is formed in centers (portion except for the hatching portion in FIG. 1, a hatching portion in FIG. 13B) of the plane portions 104c. FIG. 13C is an explanatory view showing an analysis model Z in which the convex-concave part 111 is formed into C-shapes in the edges of the plane portions 104c.

The analysis models X to Z shown in FIG. 13A to FIG. 13C were analyzed under the conditions listed as follows.

The sheet thicknesses of the analysis models X to Z: 0.55 mm

The areas of the convex-concave parts 111 formed in the analysis models X to Z: 43% of the plane portion 104c in each of them The shapes of the convex-concave parts 111 formed in the analysis models X to Z: the convex-concave part 20 shown in FIG. 3

The convex-concave shapes 111 of the analysis models X to Z: A:B:A=1:1:1, $\theta_1=\theta_2=30°$, H1=H2=1.1 mm, the Length L of one side of the unit area=16.1 mm (can be obtained from FIGS. 4 and 12)

In the analysis models X and Z, the widths of the formed convex-concave parts 111 were W1=36 mm (two rows of substantially I shapes), and W4=72 mm (four rows of substantially I shapes). Further, in the analysis model Y, the convex-concave parts 111 are formed in centers of the plane portions 104c in a range of W2=146 mm and W3=340 mm.

The analysis method and the evaluation item: torsional stiffness in the direction of the circled number 1 in FIG. 1, and torsional stiffness in the direction of the circled number 2 by a static implicit method (FEM) were evaluated. The following evaluation was similarly performed.

Figure 14:
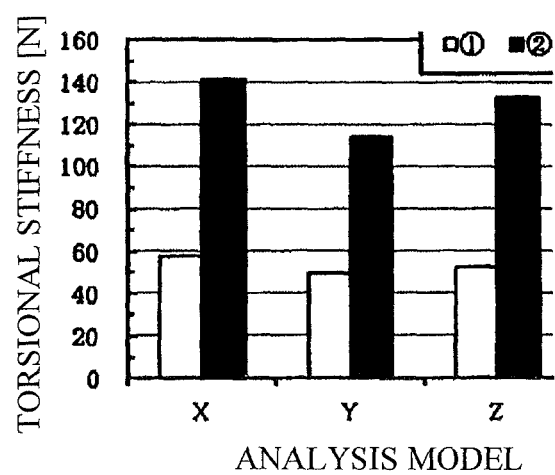
FIG. 14 is a graph showing effectiveness of forming the convex-concave part into a loop shape with respect to the analysis models X to Z.

FIG. 14 is a graph showing effectiveness of forming the convex-concave part into a loop-shape with respect to the analysis models X to Z.

As shown in the graph of FIG. 14, the torsional stiffness of the analysis model X with the convex-concave parts 111 formed in the loop-shaped areas was the highest irrespective of torsional directions. The torsional stiffness of the analysis model Y with the convex-concave parts 111 formed in the centers of the plane portions 104c was the lowest, and the torsional stiffness of the analysis model Z with the convex-concave parts 111 formed into the C-shapes in the plane portions 104c was between that of the analysis model X and that of the analysis model Y.

The torsional stiffness of the analysis model X was higher by 16% in the direction of the circled number 1 in FIG. 1, and was higher by 24% in the direction of the circled number 2 as compared with the torsional stiffness of the analysis model Y. In contrast with this, the torsional stiffness of the analysis model Z was higher by 5% in the direction of the circled number 1, and was higher by 16% in the direction of the circled number 2 as compared with the torsional stiffness of the analysis model Y, but was less favorable than that of the analysis model X, and the torsional stiffness of the analysis model X was higher by 10% in the direction of the circled number 1, and was higher by 7% in the direction of the circled number 2 as compared with the torsional stiffness of the analysis model Z.

As shown in the graph of FIG. 14, it is indicated that the analysis model X has the torsional stiffness that exceeds that of the analysis models Y and Z with respect to both the directions of the direction of the circled number 1 and the direction of the circled number 2, and forming the convex-concave part 111 into a loop-shape by including the edges of the plane portion 104c is effective.

Example 2

The analysis model X in which the substantially I shapes which form the convex-concave part 111 in the edges (the hatching portions in FIGS. 1 and 13A) of the plane portions 104c of the front floor panel 110 were constructed in two rows, an analysis model X-1 in which the substantially I shapes were constructed in one row, and an analysis model X-3 in which the substantially I shapes were formed in three rows were compared. The constraint conditions and the torsional directions were designated as the same as in example 1. The detailed conditions of the analysis models X, X-1 and X-3 will be shown.

The sheet thicknesses of the analysis models X, X-1 and X-3: 0.55 mm

The areas of the convex-concave parts formed in the analysis models X, X-1 and X-3: 43% of the plane portion 104c in each The convex-concave shapes 111 of the analysis models X, X-1 and X-3: A:B:A=1:1:1

The heights of the convex-concave shapes 111 of the analysis models X and X-1: H1=H2=1.1 mm The height of the convex-concave shape 111 of the analysis model X-3: H1=H2=0.75 mm (In the case of three rows of the substantially I shapes, it was considered as difficult to form H1=H2=1.1 mm from the viewpoint of formability, and therefore, the height that satisfies $\theta_1=\theta_2=30°$ as shown in the example 1 of the convex-concave shape 111 was adopted)

Figure 16:
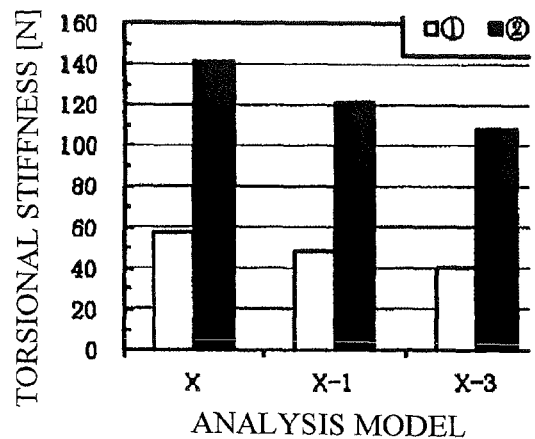
FIG. 16 is a graph showing an analysis result of bending stiffness of analysis models X, X-1 and X-3.

The schematic shapes of the analysis models X, X-1 and X-3: width W1 formed similarly to the analysis model X in FIG. 1=36 mm FIG. 16 is a graph showing an analysis result of torsional stiffness of the analysis models X, X-1 and X-3.

As shown in the graph in FIG. 16, the torsional stiffness of the analysis model X (two I shapes) was the highest. The reason why the torsional stiffness of the analysis model X-1 (one I shape) is low is that since anisotropy becomes high, there exist the directions in which the torsional stiffness becomes approximately the same as that of the flat sheet. The reason why the torsional stiffness of the analysis model X-3 (three I shapes) is lower as compared with that of the analysis model X (two I shapes) is that since the height (H1 and H2) of the convex-concave of X-3 is lower as compared with that of X, a second moment of area is reduced. Like this, as the number of I shapes increases, the height of the convex-concave part 111 becomes lower, and therefore, the analysis model X that is formed of the two I shapes had the highest torsional stiffness.

Example 3

Torsional stiffness was analyzed similarly to example 1 with respect to the front floor panel with a sheet thickness of 0.55 mm, in which the widths of the edges of the plane portion 104c were designated as 24, 36 and 48 mm, where the convex-concave part 111 was formed with A:B:A=1:1:1, $\theta_1=\theta_2=30°$, and the number of the substantially I shapes included in the width direction was designated as two, and the front floor panel with a sheet thickness of 0.65 mm in which the convex-concave part 111 was not formed.

Figure 15:
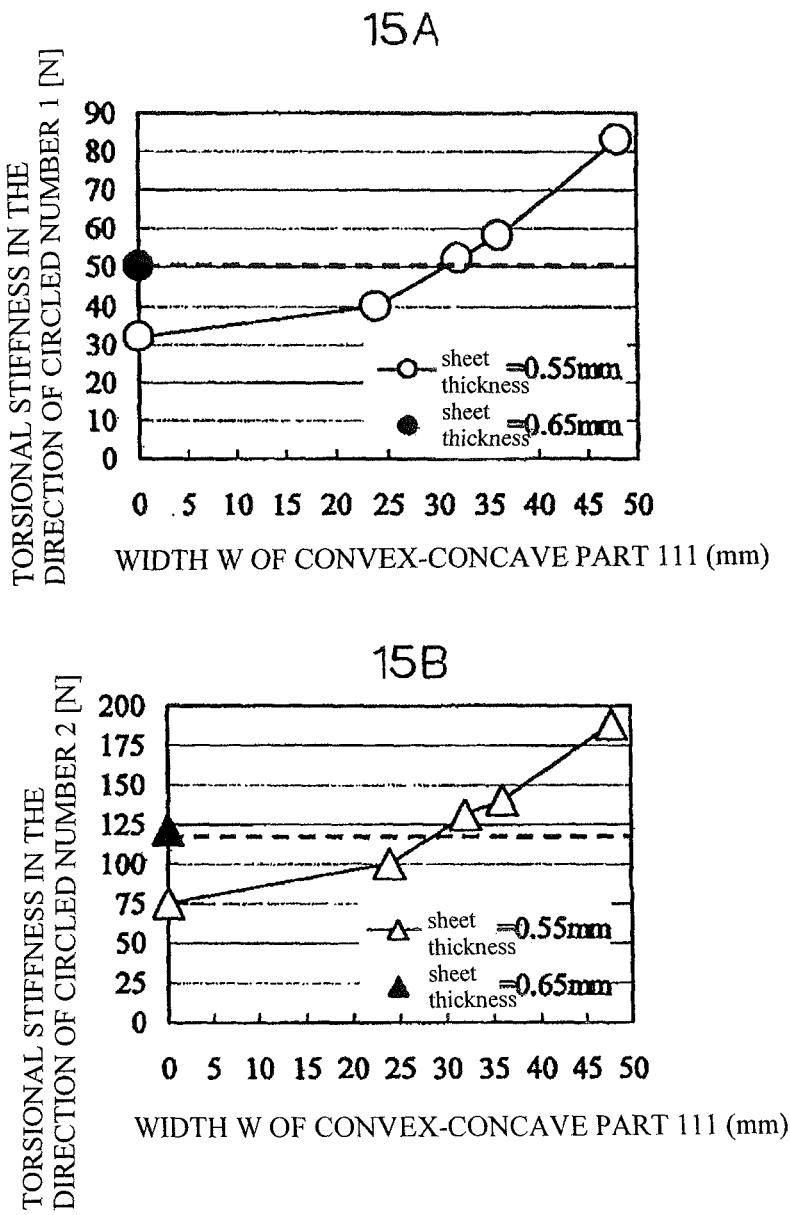
FIG. 15A is a graph showing a relationship of a width of the convex-concave part and stiffness of the front floor panel.
FIG. 15B is a graph showing the relationship of the width of the convex-concave part and stiffness of the front floor panel.

FIG. 15A is a graph showing a relationship of the width W of the convex-concave part 111, and the torsional stiffness in the direction of the circled number 1, of the front floor panel. FIG. 15B is a graph showing a relationship of the width of the convex-concave part 111, and the torsional stiffness in the direction of the circled number 2, of the front floor panel.

As shown in the graphs in FIG. 15A and FIG. 15B, it has been found out that the width W is designated as at least 32 mm (at least 40% of the plane portion 104c), that is, the areas having the substantially I shapes are arranged in two rows with respect to the width direction of the plane portion 104c of the front floor panel 110, whereby the sheet thickness of the front floor panel is reduced by 0.1 mm and can be reduced to 0.55 mm.

Example 4

Figure 17:
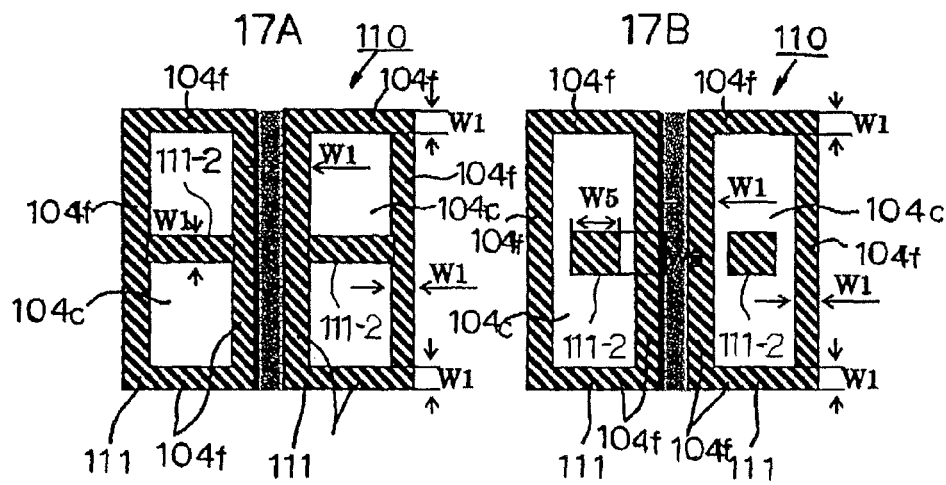
FIG. 17A is an explanatory view showing an analysis model C in which the convex-concave parts are formed in the edges and intermediate portions (hatching portions in FIG. 17A) of the plane portions of the front floor panel shown in FIG. 1.
FIG. 17B is an explanatory view showing an analysis model D in which the convex-concave parts are formed in the edges and the centers (hatching portions in FIG. 17B) of the plane portions of the front floor panel shown in FIG. 1.

FIG. 17A is an explanatory view showing an analysis model C in which the convex-concave parts 111 are formed in the edges (hatching portions in FIGS. 1 and 17A) of the plane portion 104c of the front floor pane 110 shown in FIG. 1. FIG. 17B is an explanatory view showing an analysis model D in which the convex-concave parts 111 are formed in the edges and the centers (hatching portions in FIG. 17B) of the plane portion 104c of the front floor panel 110 shown in FIG. 1.

The analysis model C shown in FIG. 17A is a model in which the convex-concave parts 111-2 that are formed rectilinearly in partial areas of the flat sheet-shaped portions as shown in FIG. 2C are connected to the loop-shaped convex-concave parts 111, and the analysis model D is a model in which the convex-concave parts 111-2 are not connected to the loop-shaped convex-concave parts 111.

The analysis models C and D were compared with the analysis model X. The constraint conditions and the torsional directions are similar to those in examples 3 and 4.

Details of the analysis models C, D and X will be shown as follows.

The sheet thicknesses of the analysis models C, D and X: 0.55 mm

The area of the convex-concave parts 111 formed in the analysis model X: 43% of the plane portion 104c

The areas of the convex-concave parts 111 formed in the analysis models C and D: 48% of the plane portion 104c in each The convex-concave shapes 111 of the analysis models C, D and X: A:B:A=1:1:1, $\theta_1=\theta_2=30°$, H1=H2=1.1 mm The schematic shapes of the convex-concave parts 111 of the analysis models C, D and X: refer to FIG. 4

Figure 18:
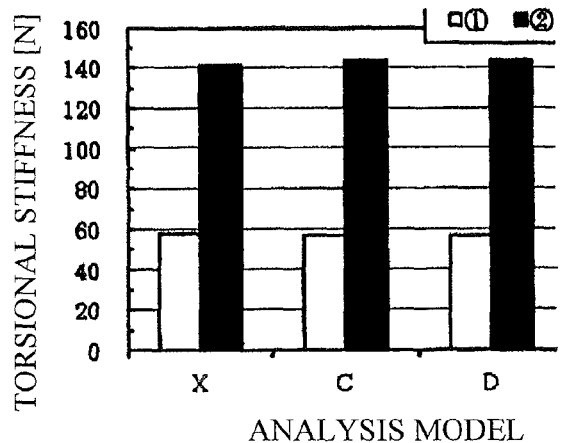
FIG. 18 is a graph showing an analysis result of bending stiffness of the analysis models C, D and X.

The width W1 forming the convex-concave part 111: 36 mm (the substantially I shapes are in two rows), W5=80 mm FIG. 18 is a graph showing an analysis result of the torsional stiffness of the analysis models C, D and X.

As shown in the graph of FIG. 18, the torsional stiffness of the circled number 2 in the analysis models C and D is improved by approximately 1 to 2% more than the torsional stiffness of the analysis model X. This is considered to be because the direction in which the convex-concave part 111-2, which is formed rectilinearly, extends is the direction that increases the torsional stiffness of the circled number 2.

The invention claimed is:

1. A front floor panel of a metal of an automotive body having a floor tunnel formed to be oriented in a longitudinal direction of the automotive body in a center in an automotive width direction of the automotive body, upright flanges disposed left and right formed at a left and right end portions in the automotive width direction to be joined to side sills, and a left and right plane portions formed between the upright flanges disposed left and right and a longitudinal wall portions of the floor tunnel disposed left and right characterized in that, the front floor panel has an convex-concave part that is formed in a loop-shaped area including an outer edge portion of the plane portion, and has a flat sheet-shaped portion formed in a remaining area except for the loop-shaped area;

wherein the convex-concave part: when based on three reference planes that are a first reference plane, an intermediate reference plane, and a second reference plane that are three planes sequentially arranged in parallel to be spaced from one another, a first unit area and a second unit area that are virtual squares are spread all over with the intermediate reference plane as a reference, and one of two directions along two sides orthogonal to each other of the virtual square is defined as a lateral direction, whereas the other one is defined as a longitudinal direction, the first unit area is divided into three at an optional ratio of A:B:A in the lateral direction, as a result, is divided into first divided areas that are two areas divided at a ratio A, and a second divided area that is one area divided at a ratio B, the second unit area is divided into three at an optional ratio of A:B:A in the longitudinal direction, as a result, is divided into second divided areas that are two areas divided at the ratio A, and a first divided area that is one area divided at the ratio B, with the intermediate reference plane as a reference, the first unit areas and the second unit areas are alternately disposed with respect to the longitudinal direction and the lateral direction respectively, a first reference area having a substantially I shape formed of the adjacent first divided areas, and a second reference area having a substantially I shape formed of the adjacent second divided areas are included, the convex-concave part is a shape part having a first area protruding toward the first reference plane from the first reference area, and a second area protruding toward the second reference plane from the second reference area defined on the intermediate reference plane, the first area has a first top surface obtained by projecting the first reference area into the first reference plane at either unity or reduction magnification, and a first side surface that connects a contour of the first top surface and a contour of the first reference area, and the second area has a second top surface obtained by projecting the second reference area into the second reference plane at either unity or reduction magnification, and a second side surface that connects a contour of the second top surface and a contour of the second reference area.

2. The front floor panel according to claim 1,
wherein the convex-concave part has two or more rows of areas having the substantially I shapes in the outer edge portion.

3. The front floor panel according to claim 2,
wherein an area of the loop-shaped area is at least 40% of an area of the plane portion.

4. The front floor panel according to claim 1,
wherein one or two or more of the convex-concave parts are formed annularly in a partial area of the flat sheet-shaped portion.

5. The front floor panel according to claim 1,
wherein one or two or more of convex-concave parts are formed rectilinearly in a partial area of the flat sheet-shaped portion.

6. The front floor panel according to claim 5,
wherein the two or more convex-concave parts formed rectilinearly intersect each other.

7. The front floor panel according to claim 1,
wherein the first reference area and the second reference area are configured by connecting the first divided areas and the second divided areas respectively, and thereafter, deforming parts of corner portions of both of the first divided areas and the second divided areas into circular arc shapes in such a manner that areas of both of the first divided areas and the second divided areas do not change.

8. The front floor panel according to claim 1, wherein an inclination angle $\theta_1(°)$ of the first side surface to the intermediate reference plane and an inclination angle $\theta_2(°)$ of the second side surface to the intermediate reference plane are respectively 10° to 90°.

9. The front floor panel according to claim 1,
wherein at least parts of the first reference plane, the intermediate reference plane and the second reference plane that are sequentially arranged are respectively formed of parallel curved surfaces.

10. The front floor panel according to claim 1,
wherein the convex-concave part is formed by press-forming a metal sheet.

11. The front floor panel according to claim 10,
wherein the metal sheet is a steel sheet with a sheet thickness t (mm) before forming of at most 0.65 mm.

12. The front floor panel according to claim 10,
wherein the metal sheet is an aluminum alloy sheet with a sheet thickness t (mm) before forming of 0.5 mm to 2.0 mm.

13. The front floor panel according to claim 9,
wherein a ratio (L/t) of a length L (mm) of one side of the unit area composed of the virtual square, and the sheet thickness t (mm) is 10 to 2000.

14. The front floor panel according to claim 9,
wherein when a length of a short side of a rectangular shape formed of the area divided at the ratio B is defined as BL (mm) with respect to the length L (mm) of the one side of the unit area composed of the virtual square, $0.2L \leq BL \leq 0.6L$ is satisfied.

15. The front floor panel according to claim 9,
wherein a ratio (H1/t) of a projection height H1 (mm) of the first area and the sheet thickness t (mm), and a maximum inclination angle $\theta_1(°)$ formed of the first side surface and the intermediate reference plane satisfy a relationship of $1 \leq (H1/t) \leq -3\theta_1+272$, and a ratio (H2/t) of a projection height H2 (mm) of the second area and the sheet thickness t (mm), and a maximum inclination angle $\theta_2(°)$ formed of the second side surface and the intermediate reference plane satisfy a relationship of $1 \leq (H2/t) \leq -3\theta_2+272$.

* * * * *